UNITED STATES PATENT OFFICE 2,559,146

VINYL CHLORIDE RESINS PLASTICIZED WITH CHLORO PHENOXY ACETATES

Joachim Dazzi, Dayton, Ohio, assignor to Monsanto Chemical Company, St. Louis, Mo., a corporation of Delaware No Drawing. Application May 27, 1948, Serial No. 29,644

6 Claims. (Cl. 260—30.8)

This invention relates to new compositions made by the incorporation of novel plasticizers in vinyl chloride resins. More particularly the invention relates to a method of modifying vinyl chloride polymers by the incorporation of a class of aromatic esters.

The primary purpose of this invention is to provide a method of modifying vinyl chloride polymers. A further purpose of the invention is to prepare vinyl chloride compositions having unusual permanence and excellent flexibility at low temperatures.

It has been found that esters having the structural formula:

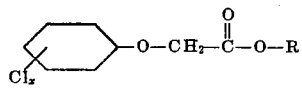

wherein $x$ is a small whole number from 1 to 5, inclusive, R is a hydrocarbon radical, oxa-hydrocarbon radical or thia-hydrocarbon radical, said radicals having from 6 to 12 carbon, oxygen and sulfur atoms in their molecular structure, and wherein the product of $x$ and the number of carbon, oxygen and sulfur atoms in the R radical is at least equal to ten and not more than 30, are plasticizers for vinyl chloride polymers. The new plasticizers have remarkedly low volatility which is achieved without sacrifice of low temperature flexibility. Typical examples of esters which may be used in the practice of this invention are: n - butoxyethoxyethyl o - chlorophenoxyacetate, 2-ethylhexyl 2,4,5-trichlorophenoxyacetate, β-octylmercaptoethyl 2,4 - dichlorophenoxyacetate, 2 - ethylhexoxyethyl - 2,4,5-trichlorophenoxyacetate.

The esters are valuable plasticizers for polyvinyl chloride and copolymers of more than 70 percent vinyl chloride and up to 30 percent other polymerizable monomers, for example vinyl acetate and other vinyl esters of monocarboxylic acids, ethyl maleate, ethyl fumarate, and other alkyl esters of maleic and fumaric acids.

The plasticizers are blended with the vinyl resin in the conventional manner, for example by mixing on a roll mill, a Banbury type mixer or any other suitable mixing device. The plasticizers are used in proportions necessary to achieve the desired plasticity. Although the quantity of plasticizer will depend upon the particular polymer to be plasticized and upon its molecular weight it is generally found that from 5 to 50 percent of plasticizer will in most cases produce a satisfactory composition for general utility. Such quantity of plasticizer will generally remain as a permanent part of the vinyl resin and the modified vinyl resin so prepared will not deteriorate or become embrittled by reason of the loss of the plasticizer during use.

The value of the plasticizers are estimated by three tests (1) compatibility (2) volatility and (3) Clash-Berg flex temperature. The compatibility is determined by visual inspection, clarity being a requisite in most applications for vinyl chloride polymers. The volatility is estimated by the test of heating at 105° C. for 24 hours and measuring the percentage of the plasticizers evaporated by loss of weight. The Clash-Berg flex temperature is determined by cooling the polymer sample to about −50° C. and observing the change in the modulus of rigidity as the sample warms up to room temperature, the flex temperature being that at which the modulus of rigidity is 135,000 pounds per square inch. Of these tests the compatibility is of primary importance while the others are only critical for certain applications. If the polymer is to be subjected to outside weather conditions flex temperatures of −20 to −30° C. are desirable, otherwise 0° C. is satisfactory. If the polymer is to be subjected to elevated temperatures a volatility of 5 to 10 percent is advantageous, otherwise volatilities as high as 25 percent are often not objectionable. The volatilities and flex temperature, of polymer plasticizer blends are difficult to predict and often have no apparent relationship to the physical constants of the plasticizer.

The new plasticizers are of general utility in softening vinyl chloride polymers. They may be used as the only plasticizing component in a compounded vinyl chloride polymer, or they may be used in conjunction with other plasticizers.

Further details of the practice of this invention are set forth with respect to the following specific examples.

Example 1

The butoxyethoxyethyl ester of o-chlorophenoxyacetic acid was evaluated as a plasticizer by milling 40 parts by weight of plasticizer with 60 parts of polyvinyl chloride and one percent of a standard stabilizer. The thoroughly blended samples were tested for low temperature flex in accordance with the Clash-Berg procedure and were found to have a value of −31° C. The volatility of the compounded resin was found to be 11.8 percent.

Example 2

Using the procedure described in the preceding example the 2-ethylhexyl ester of 2,4,5-trichlorophenoxyacetic acid was evaluated and found to have a flex temperature of −19° C. and a volatility of 6.29 percent.

*Example 3*

Using the procedure described in Example 1, the butylcarbitol ester of 2,4-dichlorophenoxyacetic acid was evaluated. A flex temperature of −22.9° was observed, and a volatility of 7.1 percent was measured.

Although the invention has been described with respect to specific embodiments, it is not intended that the details thereof shall be construed as limitations upon the scope of the invention except to the extent incorporated in the following claims.

I claim:

1. A plasticized vinyl resin composition which comprises a vinyl chloride polymer containing intimately dispersed therein an ester having the structural formula:

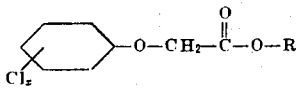

wherein $x$ is a small whole number from 1 to 5, inclusive, R is a radical of the group consisting of hydrocarbon radicals, oxahydrocarbon radicals, and thia hydrocarbon radicals, said radicals having a total of from 6 to 12 carbon, oxygen and sulfur atoms, and wherein the product of $x$ and the number of carbon, oxygen and sulfur atoms in the R radical is a number from ten to thirty, inclusive.

2. A vinyl resin composition which comprises a polyvinyl chloride having intimately dispersed therein from 5 to 50 percent by weight of an ester having the structural formula:

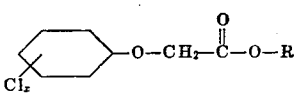

wherein $x$ is a small whole number from 1 to 5, inclusive, R is a radical of the group consisting of hydrocarbon radicals, oxahydrocarbon radicals and thia hydrocarbon radicals, said radicals having a total of from 6 to 12 carbon, oxygen and sulfur atoms, and wherein the product of $x$ and the number of carbon, oxygen and sulfur atoms in the R radical is a number from ten to thirty, inclusive.

3. A vinyl resin composition which comprises a copolymer of at least 70 percent of vinyl chloride and up to 30 percent of a monomer of the group consisting of vinyl acetate, ethyl maleate, ethyl fumarate, having intimately dispersed therein from 5 to 50 percent of an ester having the structural formula:

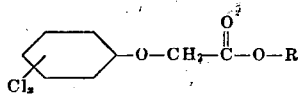

wherein $x$ is a small whole number from 1 to 5, inclusive, R is a radical of the group consisting of hydrocarbon radicals, oxahydrocarbon radicals and thia hydrocarbon radicals, said radicals having a total of from 6 to 12 carbon, oxygen and sulfur atoms in their molecular structure, and wherein the product of $x$ and the number of carbon, sulfur and oxygen atoms in the R radical is a number from ten to thirty, inclusive.

4. A vinyl resin composition which comprises a polyvinyl chloride having intimately dispersed therein from 5 to 50 percent of the butoxyethoxyethyl ester of o-chlorophenoxyacetic acid.

5. A vinyl resin composition which comprises polyvinyl chloride having intimately dispersed therein from 5 to 50 percent of the 2-ethylhexyl ester of 2,4,5-trichlorphenoxyacetic acid.

6. A vinyl resin composition which comprises polyvinyl chloride having intimately dispersed therein from 5 to 50 percent of the butylcarbitol esters of 2,4-dichlorophenoxyacetic acid.

JOACHIM DAZZI.

REFERENCES CITED

The following references are of record in the file of this patent:

UNITED STATES PATENTS

| Number | Name | Date |
|---|---|---|
| 2,335,652 | D'Alelio | Nov. 30, 1943 |
| 2,396,513 | Jones | Mar. 12, 1946 |

FOREIGN PATENTS

| Number | Country | Date |
|---|---|---|
| 882,648 | France | Mar. 8, 1943 |